US011995537B1

(12) United States Patent
Sather et al.

(10) Patent No.: US 11,995,537 B1
(45) Date of Patent: May 28, 2024

(54) TRAINING NETWORK WITH BATCHES OF INPUT INSTANCES

(71) Applicant: Perceive Corporation, San Jose, CA (US)

(72) Inventors: Eric A. Sather, Palo Alto, CA (US); Steven L. Teig, Menlo Park, CA (US); Andrew C. Mihal, San Jose, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 1150 days.

(21) Appl. No.: 15/921,633

(22) Filed: Mar. 14, 2018

(51) Int. Cl.
G06N 3/08 (2023.01)
G06F 11/00 (2006.01)

(52) U.S. Cl.
CPC ............. *G06N 3/08* (2013.01); *G06F 11/004* (2013.01); *G06F 2201/87* (2013.01)

(58) Field of Classification Search
CPC  G06N 3/08; G06N 3/04; G06N 3/084; G06N 3/0481; G06F 11/004; G06F 2201/87; G06F 17/18
See application file for complete search history.

(56) References Cited

U.S. PATENT DOCUMENTS

| | | | |
|---|---|---|---|
| 5,255,347 A | 10/1993 | Matsuba et al. | |
| 5,461,698 A | 10/1995 | Schwanke et al. | |
| 7,536,413 B1 * | 5/2009 | Mohan | G06F 16/355 |
| 8,429,106 B2 | 4/2013 | Downs et al. | |
| 9,928,448 B1 | 3/2018 | Merler et al. | |
| 9,928,449 B2 | 3/2018 | Chavez et al. | |
| 10,019,654 B1 | 7/2018 | Pisoni | |
| 11,586,902 B1 | 2/2023 | Sather et al. | |
| 2003/0033263 A1 | 2/2003 | Cleary | |
| 2011/0282897 A1 | 11/2011 | Li et al. | |
| 2014/0079297 A1 | 3/2014 | Tadayon et al. | |
| 2016/0132786 A1 * | 5/2016 | Balan | G06N 20/00 706/12 |

(Continued)

FOREIGN PATENT DOCUMENTS

WO    2016118402 A1    7/2016

OTHER PUBLICATIONS

Michael A. Nielsen, "Neural Networks and Deep Learning", Determination Press, 2015. "Chapter 2. How the backpropagation algorithm works". 27 pages. (Year: 2015).*

(Continued)

*Primary Examiner* — Tan H Tran
(74) *Attorney, Agent, or Firm* — ADELI LLP

(57) ABSTRACT

Some embodiments provide a method for training a machine-trained (MT) network that processes input data using network parameters. The method maps a set of input instances to a set of output values by propagating the set of input instances through the MT network. The set of input instances include input instances for each of multiple categories. The method selects multiple input instances as anchor instances. For each anchor instance, the method computes a loss function as a comparison between the output value for the anchor instance and each output value for an input instance in a different category than the anchor. The method computes a total loss function for the MT network as a sum of the loss function computed for each anchor instance. The method trains the network parameters using the computed total loss function.

18 Claims, 8 Drawing Sheets

(56) References Cited

U.S. PATENT DOCUMENTS

| | | | |
|---|---|---|---|
| 2016/0379352 | A1 | 12/2016 | Zhang et al. |
| 2017/0124385 | A1 | 5/2017 | Ganong et al. |
| 2017/0161640 | A1* | 6/2017 | Shamir ............... G06N 20/00 |
| 2017/0278289 | A1 | 9/2017 | Marino et al. |
| 2017/0357896 | A1 | 12/2017 | Tsatsin et al. |
| 2018/0068221 | A1 | 3/2018 | Brennan et al. |
| 2018/0075849 | A1* | 3/2018 | Khoury ................ G10L 15/16 |
| 2018/0114113 | A1* | 4/2018 | Ghahramani ....... G06N 3/0454 |
| 2018/0165554 | A1 | 6/2018 | Zhang et al. |
| 2018/0232566 | A1* | 8/2018 | Griffin ............... G06F 16/5838 |
| 2019/0005358 | A1 | 1/2019 | Pisoni |
| 2019/0065957 | A1* | 2/2019 | Movshovitz-Attias ..................... G06N 3/04 |
| 2019/0130231 | A1* | 5/2019 | Liu ..................... G06K 9/6828 |
| 2019/0180176 | A1 | 6/2019 | Yudanov et al. |
| 2019/0258925 | A1 | 8/2019 | Li et al. |
| 2019/0279046 | A1 | 9/2019 | Han et al. |
| 2019/0362233 | A1 | 11/2019 | Aizawa et al. |
| 2020/0050941 | A1 | 2/2020 | Zhuang et al. |
| 2020/0065656 | A1* | 2/2020 | Song ..................... G06N 3/08 |

OTHER PUBLICATIONS

"'n'-Dimensional Euclidean Distance" available to the public as on Sep. 10, 2015 and retrieved via Internet Archive from [https://hlab.stanford.edu/] on [Jul. 14, 2021]. 3 pages. (Year: 2015).*

Weinberger et al. Distance Metric Learning for Large Margin Nearest Neighbor Classification. Journal of Machine Learning Research 10 (2009) 207-244. (Year: 2009).*

Meyer et al. Nearest Neighbour Radial Basis Function Solvers for Deep Neural Networks, available as an ICLR 2018 Conference Blind Submission on Feb. 25, 2018; retrieved from [https://openreview.net/forum?id=SkFEGHx0Z] on [Jul. 4, 2021] with reviewer comments. 18 pages. (Year: 2018).*

Standard Deviation and Variance. Web article at Math Is Fun. Available to the public as of Jan. 2, 2015. Retrieved via Internet Archive from [https://www.mathsisfun.com/data/standard-deviation.html] on [Dec. 15, 2021]. 6 pages (Year: 2015).*

Weisstein, Eric W. "Chi-Squared Distribution." From MathWorld—A Wolfram Web Resource. Retrieved from [https://mathworld.wolfram.com/Chi-SquaredDistribution.html] on [Nov. 23, 2021]. (Year: 2021).*

Keller et al. Learning Deep Descriptors with Scale-Aware Triplet Networks. 2018 IEEE/CVF Conference on Computer Vision and Pattern Recognition. DOI 10.1109/CVPR.2018.00292. 9 pages. (Year: 2018).*

Lin, Fu-Ren et al. Active training of backpropagation neural networks using the learning by experimentation methodology. Annals of Operations Research 75(1997) 105-122. (Year: 1997).*

Mandelbaum, Amit et al., "Distance-based Confidence Score for Neural Network Classifiers," Sep. 28, 2017, 10 pages, arXiv:1709.09844v1, Computer Research Repository (CoRR), Cornell University, Ithaca, NY, USA.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Huang, Gao, et al., "Multi-Scale Dense Networks for Resource Efficient Image Classification," Proceedings of the 6th International Conference on Learning Representations (ICLR 2018), Apr. 30-May 3, 2018, 14 pages, ICLR, Vancouver, Canada.

Jain, Anil K., et al., "Artificial Neural Networks: A Tutorial," Computer, Mar. 1996, 14 pages, vol. 29, Issue 3, IEEE.

Liu, Wei, et al., "SSD: Single Shot MultiBox Detector," Proceedings of 2016 European Conference on Computer Vision (ECCV '16), Oct. 8-16, 2016, 17 pages, Lecture Notes in Computer Science, vol. 9905, Springer, Cham, Amsterdam, Netherlands.

Non-Published commonly Owned U.S. Appl. No. 15/921,630, filed Mar. 14, 2018, 34 pages, Perceive Corporation.

Non-Published commonly Owned U.S. Appl. No. 15/921,634, filed Mar. 14, 2018, 34 pages, Perceive Corporation.

Redmon, Joseph, et al., "YOLOv3: An Incremental Improvement," Apr. 8, 2018, 5 pages, arXiv:1804.02767, Computer Research Repository (CoRR)—Cornell University, Ithaca, NY, USA.

Schroff, Florian, et al., "FaceNet: A Unified Embedding for Face Recognition and Clustering," Proceedings of 2015 IEEE Conference on Computer Vision and Pattern Recognition (CVPR 2015), Jun. 7-12, 2015, 9 pages, IEEE, Boston, MA, USA.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Li, Hong-Xing, et al., "Interpolation Functions of Feedforward Neural Networks," Computers & Mathematics with Applications, Dec. 2003, 14 pages, vol. 46, Issue 12, Elsevier Ltd.

Bhavsar, Hetal, et al., "Support Vector Machine Classification using Mahalanobis Distance Function," International Journal of Scientific & Engineering Research, Jan. 2015, 12 pages, vol. 6, No. 1, IJSER.

He, Qin, "Neural Network and Its Application in IR," Month Unknown 1999, 31 pages.

Liu, Yishu, et al., "Scene Classification via Triplet Networks," IEEE Journal of Selected Topics in Applied Earth Observations and Remote Sensing, Jan. 2018, 18 pages, vol. 11, No. 1, IEEE.

Nguyen, Bac, et al., "Supervised Distance Metric Learning Through Maximization of the Jeffrey Divergence," Pattern Recognition, Nov. 16, 2016, 11 pages, vol. 64, Elsevier Ltd.

Urtasun, R., "Lecture 9: Support Vector Machines," CSC2515 Fall 2015 Introduction to Machine Learning, Month Unknown 2015, 25 pages.

Xiang, Shiming, et al., "Learning a Mahalanobis distance metric for data clustering and classification," Pattern Recognition, Dec. 1, 2008, 13 pages, vol. 41, No. 12, Elsevier Ltd.

Yang, Liu, "Distance Metric Learning: A Comprehensive Survey," May 19, 2006, 51 pages.

Zhao, Bin, et al., "Maximum Margin Clustering with Multivariate Loss Function," 2009 Ninth IEEE International Conference on Data Mining, Dec. 6-9, 2009, 10 pages, IEEE, Miami Beach, FL.

Kohrs, Arnd, et al., "Improving Collaborative Filtering with Multimedia Indexing Techniques to Create User-Adapting Web Sites," Proceedings of the Seventh ACM International Conference on Multimedia (Part 1), Oct. 1999, 10 pages, ACM.

Karresand, Martin, et al., "File Type Identification of Data Fragments by Their Binary Structure," Proceedings of the 2006 IEEE Workshop on Information Assurance, Jun. 21-23, 2006, 8 pages, IEEE, West Point, NY, USA.

Hermans, Alexander, et al., "In Defense of the Triplet Loss for Person Re-Identification," Nov. 21, 2017, 17 pages, retrieved from https://arxiv.org/abs/1703.07737.

Qian, Qi, et al., "Efficient Distance Metric Learning by Adaptive Sampling and Mini-Batch Stochastic Gradient Descent (SGD), Machine Learning, Month Unknown 2015, 20 pages, Springer.

Zheng, Wei-Shi, et al., "Person Re-identification by Probabilistic Relative Distance Comparison," 2011 Proceedings of CVPR—IEEE Computer Society Conference on Computer Vision and Pattern Recognition, Jun. 2011, 8 pages, IEEE, Colorado Springs, CO, USA.

* cited by examiner

US 11,995,537 B1

TRAINING NETWORK WITH BATCHES OF INPUT INSTANCES

BACKGROUND

Machine learning automates the creation, based on training data, of models that can then be used to make predictions. A deep neural network is an example of a machine-trained network. A class of models called deep neural networks (or DNNs) has become popular over the last few years for the machine-trained networks. Different types of DNN's include feedforward, convolutional, recurrent, long-short term memory (LSTM), and Neural Turing Machines (NTM).

Neural networks typically involve many (e.g., thousands, millions, or even potentially billions) of weights that are determined during training and then used for inference when the neural network is embedded into a device. The goal of the training is to optimize the performance (e.g., classification, regression, generation, etc.) of the neural network in handling real-life data, typically by attempting to minimize the error of the network in processing the training data.

BRIEF SUMMARY

Some embodiments of the invention provide a novel method for training a machine-trained network. The machine-trained network is a multi-layer node network that utilizes a batch of inputs that includes multiple training instances for each of several categories. The multi-layer network of some embodiments includes a layer of one or more input nodes, a layer of one or more output nodes, and one or more layers of hidden (interior) nodes. Each node in the multi-layer network produces an output value based on one or more input values. Specifically, each hidden node and output node, in some embodiments, bases the output value on the output values of a set of other nodes (e.g., the set of nodes of the previous layer). In some embodiments, each node includes (i) a linear component that uses a set of weight values to linearly combine the input values of the node to produce an intermediate result and (ii) a non-linear component that applies a non-linear function to the intermediate result to calculate the output value for the node.

During training of the network, the weight values are adjusted to arrive at a trained network that produces optimal outputs for any input value. The multi-layer network may be designed to perform a specific function when embedded in a device (e.g., a mobile device such as a smart phone, a vehicle sensor array, a virtual assistant device such as those offered by Amazon® and Google®, an Internet of Things (IOT) device such as a smart refrigerator, baby monitor, etc., or other devices). Such functions can include face recognition, voice recognition, identification of types of objects in images, large-scale data analysis, etc.

To train the multi-layer network, some embodiments propagate a minibatch of input instances through the multi-layer network. The minibatch includes several instances for each of multiple categories. In an example of a multi-layer network that is used for image recognition, the categories may include dog, cat, horse, truck, airplane, etc. Each input (e.g., an image, a voice snippet, etc.) propagates through the network, with each layer of nodes receiving one or more inputs and generating an output to pass to the next layer of nodes. In the final output layer, one or more nodes receive the outputs from the previous layer and generate the outputs.

Some embodiments map each input instance to a point in a multiple dimensional space. Each output point is classified by the multi-layer network as a member of one of the categories. The instances that are correctly identified by the network as members of their corresponding categories are referred to as true positive instances (or true positives) of that category. Similarly, the instances that are correctly identified by the network as not belonging to a category are referred to as true negatives for that category. The instances that are incorrectly identified by the network as members of a category are referred to as false positives of that category. The instances that are members of a category but are identified by the network as members of other categories are referred to as false negatives of that category.

A loss function is then calculated to determine the error made by the multi-layer network in categorizing each instance compared to the expected categories of the instances. The gradient of the loss function is backpropagated through the network. During the backpropagation operation, the gradient of loss with respect to the network parameters is pushed back to adjust the weight values of the linear functions and/or the parameters of the non-linear functions.

Some embodiments provide a loss function that maximizes the true positive rate at a very low false positive rate. These embodiments iterate over all instances in a minibatch and consider each instance in turn as an anchor. For each instance used as an anchor, the true positive rate (TPR) of the network is estimated. For each anchor and each negative instance a surprise function is computed for finding a positive instance that is more distance to the anchor than the current negative instance.

For each anchor instance, a loss function is calculated that maximizes the true positive rate at low false positive rate by minimizing the worst surprise. The total loss for the minibatch is then computed as the sum of the calculated losses for each anchor.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention provide a novel method for training a multi-layer node network that utilizes a batch of inputs that includes multiple training instances for each of several categories. The multi-layer network of some embodiments includes a layer of one or more input nodes, a layer of one or more output nodes, and one or more layers of hidden (interior) nodes. Each node in the multi-layer network produces an output value based on one or more input values. Specifically, each hidden node and output node, in some embodiments, bases the output value on the output values of a set of other nodes (e.g., the set of nodes of the previous layer). In some embodiments, each node includes (i) a linear component that uses a set of weight values to linearly combine the input values of the node to produce an intermediate result and (ii) a non-linear component that applies a non-linear function to the intermediate result to calculate the output value for the node.

During training of the network, the weight values are adjusted to arrive at a trained network that produces optimal outputs for any input value. The multi-layer network may be designed to perform a specific function when embedded in a device (e.g., a mobile device such as a smart phone, a vehicle sensor array, a virtual assistant device such as those offered by Amazon® and Google®, an Internet of Things (IOT) device such as a smart refrigerator, baby monitor, etc., or other devices). Such functions can include face recognition, voice recognition, identification of types of objects in images, large-scale data analysis, etc.

I. Maximizing True Positive Rates at Low False Positive Rates in a Machine-Trained Network To train the multi-layer network, some embodiments propagate a minibatch of input instances through the multi-layer network. The minibatch includes several instances for each of multiple categories. In an example of a multi-layer network that is used for image recognition, the categories may include dog, cat, horse, truck, airplane, etc., and the minibatch includes several instances for each of these categories.

The multi-layer network is, however, not limited to image recognition and the instances of a minibatch are not limited to images. The network may be designed to perform other functions such as voice recognition, character recognition, large-scale data analysis, etc. The instances in the minibatch, therefore, may contain instances for snippets of voice, a set of characters, or instances related to other types of data analysis.

Each input (e.g., an image, a voice snippet, etc.) propagates through the network, with each layer of nodes receiving their one or more inputs and generating an output to pass to the next layer of nodes. In the final output layer, one or more nodes receive the outputs from the previous layer and generate the outputs.

A. Structured Minibatches

Figure 1:
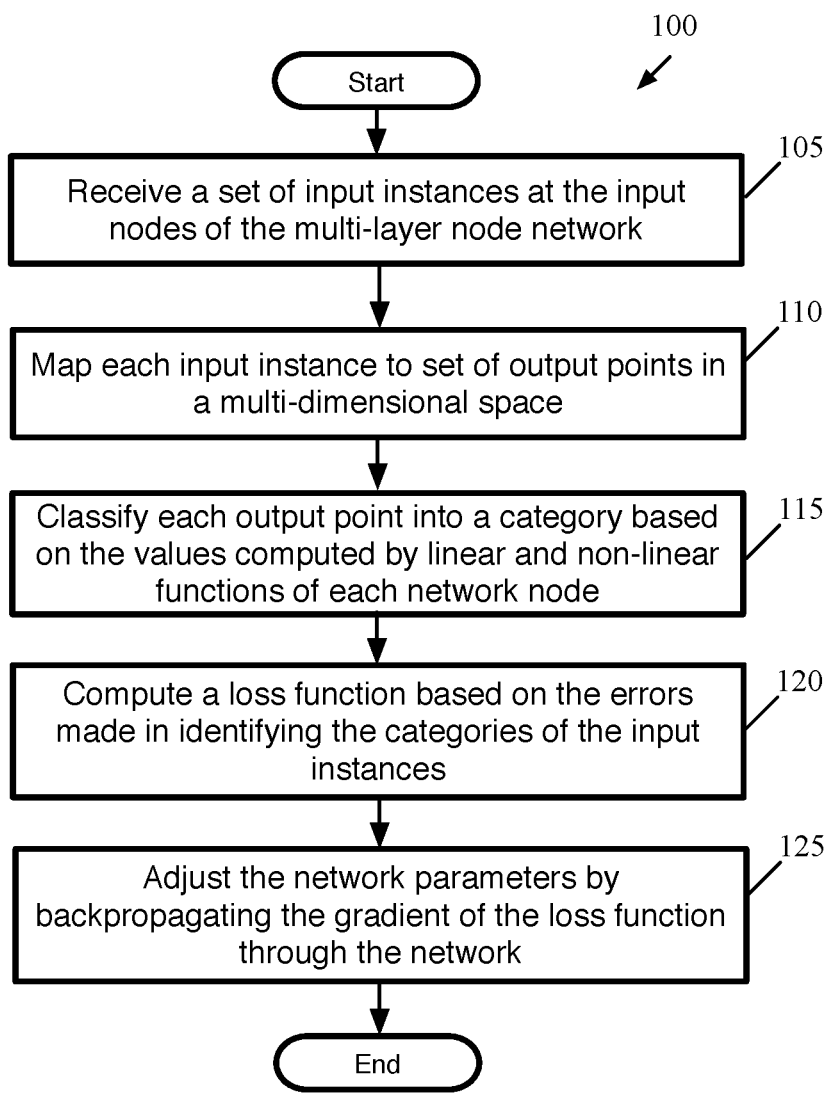
FIG. 1 conceptually illustrates a process for classifying a set of input instances into a set of categories by a multi-layer machine-trained network in some embodiments.

FIG. 1 conceptually illustrates a process 100 for classifying a set of input instances into a set of categories by a multi-layer machine-trained network in some embodiments. As shown, the process (at 105) receives a set of inputs at the input nodes of the multi-layer network. The set of inputs is also referred to as a structured minibatch. The structured minibatch includes several instances for each of multiple categories.

Figure 2:
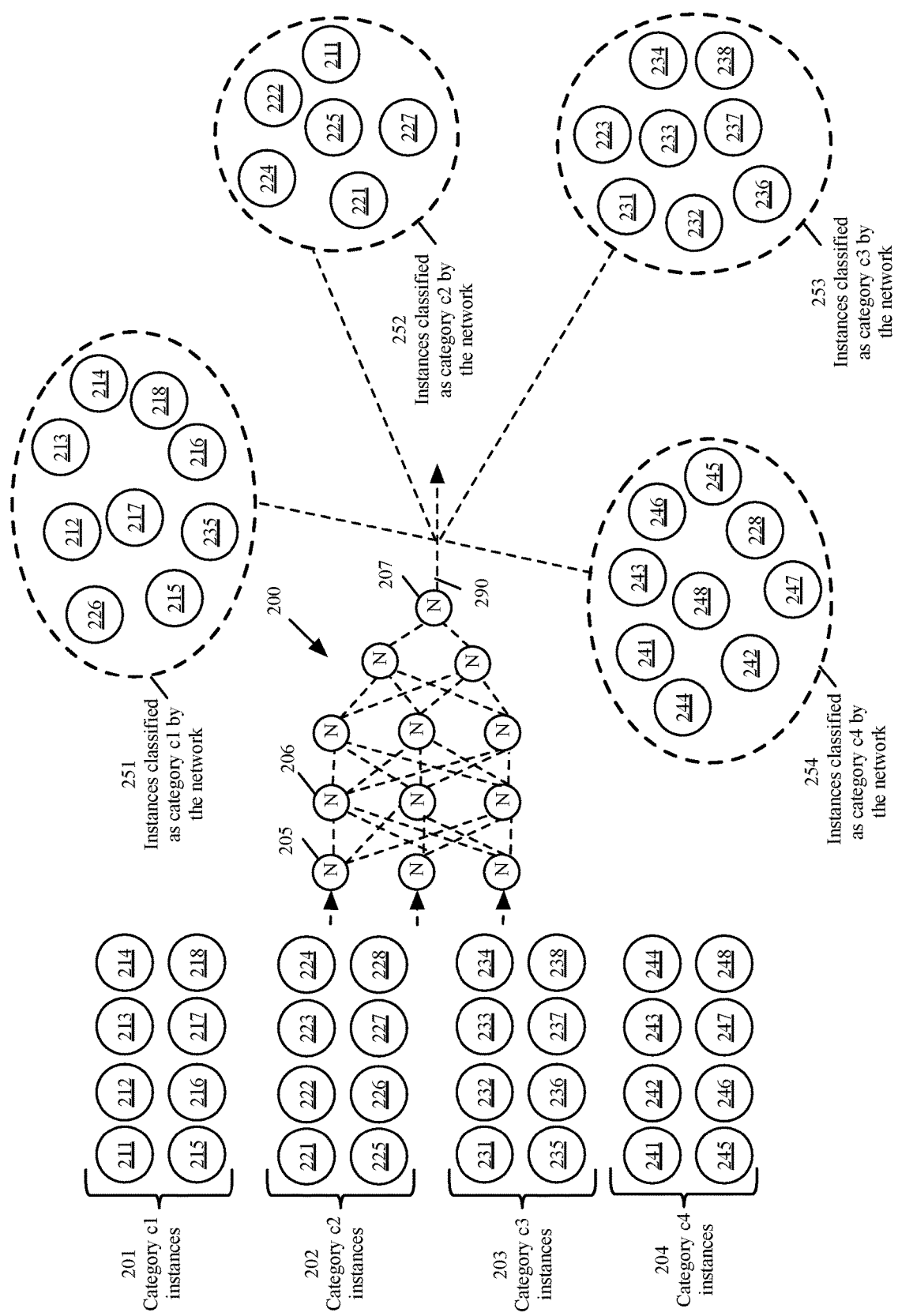
FIG. 2 conceptually illustrates a multi-layer node network in some embodiments.

As shown, the process receives a set of input instances at the input nodes of the multi-layer node network. FIG. 2 conceptually illustrates a multi-layer node network 200 in some embodiments. The figure illustrates a feedforward neural network 200 that has multiple layers of processing nodes, called neurons 205-207. In all but the first (input) and last (output) layer, each neuron 206 receives two or more outputs of neurons from earlier processing node layers and provides its output to one or more neurons in subsequent layers. The output 290 of the neuron 207 in the last layer represents the output of the network 200.

In this example, the neural network 200 only has one output node 207. Other neural networks of other embodiments have several output nodes that provide more than one output value. In addition, the neural networks of other embodiments may be types of networks other than feedforward networks (e.g., recurrent networks, etc.).

Each neuron 205-207 in neural network 200 has a linear component and a nonlinear component. The linear component of each hidden or output neuron in this example computes a dot product of a vector of weight coefficients and a vector of output values of prior nodes, plus an offset. In other words, a hidden or output node's linear operator computes a weighted sum of its inputs (which are outputs of the previous stage neurons that the linear operator receives) plus an offset. Similarly, the linear component of each input neuron 205 of some embodiments computes a dot product of a vector of weight coefficients and a vector of input values, plus an offset. In other embodiments, each input neuron receives a single input and passes that input as its output. Each neuron's nonlinear component computes a function based on the output of the neuron's linear component. This function is commonly referred to as the activation function.

In FIG. 2, a set of inputs referred to herein as a structured minibatch are received by the input neurons 205. In this example, the minibatch includes eight instances 211-248 in each of four categories $c_1$-$c_4$ 201-204. It should be understood that the number of categories and the number of instances in each category could be different. Furthermore, different categories may have different numbers of instances.

Referring back to FIG. 1, the process maps (at 110) each input instance into a point in a multi-dimensional space. For instance, the process maps each point into a D-dimensional space, where D could be an integer number such as 10, 64, 128, 400, etc. Each point in some embodiments is represented by a D-dimensional vector and the distance between two points in the D-dimensional space is calculated as the distance between the two vectors that represent the two points.

Next, process 100 classifies (at 115) each output point into a category based on the values computed by the linear and non-linear functions used by each node 205-207. The classification in some embodiments is based on the location of each output point in the D-dimensional space.

As shown in FIG. 2, the network 200 has classified the input instances into four categories 251-254 that correspond to categories $c_1$-$c_4$, respectively. For simplicity, the input instances and their corresponding output points are identified by the same labels. As shown, the neural network has correctly classified instances 212-218 as members of category $c_1$.

The neural network, however, has also classified instances 226 and 235 as members of category $c_1$. These instances are false positives of category $c_1$ since instance 226 should have been classified as member of category $c_2$ (as shown the input instance 226 is a member of $c_2$ category) and instance 235 is classified as member of category $c_3$ (as shown the input instance 235 is a member of $c_3$ category).

In addition, instance 211 that belongs to category $c_1$ is misclassified as a member of category $c_2$ by the network. This instance represents a false negative of category $c_1$. Several other instances such as 223 and 228 are also misclassified by the network.

In an application such as face recognition to unlock a cellular phone, it is very crucial to eliminate the false positives in order to prevent unauthorized access to the phone. In contrast, false negatives would prevent the phone owner from accessing the phone. For instance, a false negative may force the phone owner to take another picture of her or use another method of unlocking the phone. False negatives, therefore, are also undesirable but are not as critical as the false positives that allow unauthorized access to the phone.

Referring back to FIG. 1, the process computes (at 120) a loss function based on the errors made in identifying the categories of the input instances compared to the expected categories of the instances. The process then adjusts (at 125) the network parameters (i.e., the weight values of the linear functions and/or the parameters of the non-linear functions) to minimize the loss function by backpropagating the gradient of the loss function through the network. The process then ends.

B. Calculation of the Loss Function

Figure 3:
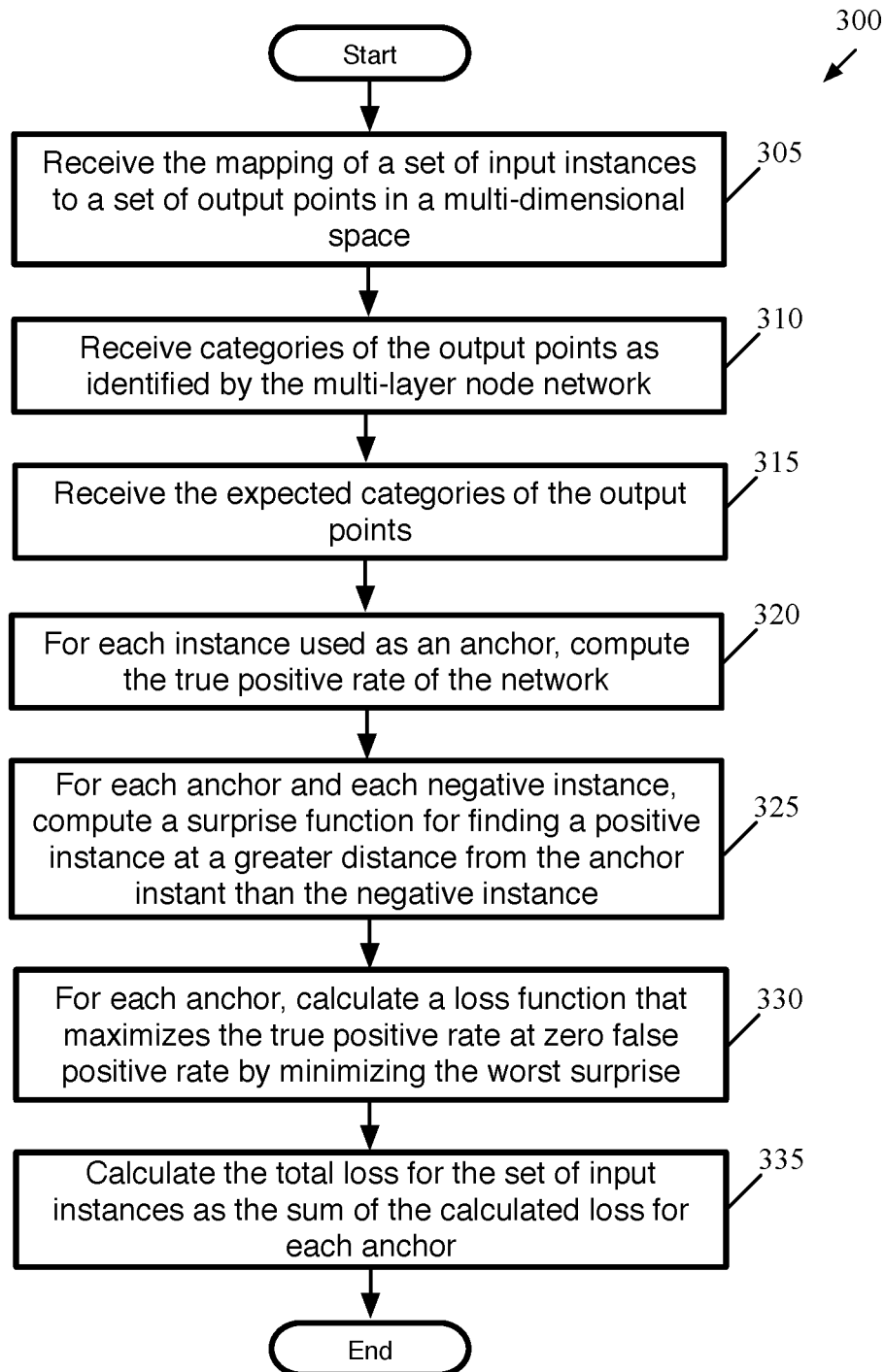
FIG. 3 conceptually illustrates a process for computing a loss function in some embodiments.

Some embodiments compute a loss function that maximizes a true positive rate of the machine-trained network at a sufficiently low false positive rate (i.e., optimally a zero false positive rate). FIG. 3 conceptually illustrates a process 300 for computing a loss function in some embodiments. As shown, the process receives (at 305) the mapping of a set of input instances to a set of points in a multiple dimensional space. For instance, the process receives the mapping of the input instances to the corresponding set of points in the multi-dimensional space as generated by process 100 described above.

The process also receives (at 310) categories of the output points as identified by the multi-layer network. For instance, the process receives the categories of the instances as identified by process 100. The process also receives (at 315) the expected categories of the output points. The category of each input instance during the training is known. As described further below, the expected categories of the input instances are sent to the loss function component of the machine-trained network during the training period.

i. Distribution of Distances to Positive Instances

As described above, the neural network maps an input instance i of category c to a point in d-dimensional space, $y_{ci}$, with components $y_{ci,d}$. The distance between the points for two instances $(c_1,i_1)$ and $(c_2,i_2)$ is computed by Equation (1):

$$r_{c1i1;c2i2} = \sqrt{\Sigma_{0 \leq d < D}[y_{c1i1;d} - y_{c2i2;d}]^2} \quad (1)$$

For each instance i of a category c, some embodiments use a function of the distance to another instance of the same category, which is normally distributed with mean $\mu_{ci}$ and variance $\sigma^2_{ci}$. The function of distance used in some embodiments is a squared distance function as defined by Equation (2):

$$f(r) = r^2 \quad (2)$$

For each instance i of a category c, the function $r^2$ is assumed to have a normal distribution with mean $\mu$ and variance $\sigma$ as shown in Equation (3):

$$r^2 = N(\mu_{ci}, \sigma^2_{ci}) \quad (3)$$

ii. Estimation of the True Positive Rate

The neural network classifies a pair of instances as being in the same category or different categories based on the distance between the mapped locations of the instances. A distance $r_{class}$ is identified for the classification of instances. For a given instance (referred to as the anchor) and a given $r_{class}$, another instance is classified as a positive (i.e., belonging to the same category as the anchor instance) if its distance, r, from the anchor satisfies $r \leq r_{class}$. For the same anchor, another instance is classified as negative (i.e., instance of another category) if $r > r_{class}$.

Using the squared distance function in Equation (2) for the distribution of distances of anchor-positive distances, the estimated true positive rate (TPR) is:

$$R^{TP}_{ci} = \Phi\left(\frac{r^2_{class} - \mu_{ci}}{\sigma_{ci}}\right) = 1 - \Phi\left(\frac{\mu_{ci} - r^2_{class}}{\sigma_{ci}}\right) \quad (4)$$

Equation (4) is the estimated probability that a randomly selected positive would be closer to the anchor than $r_{class}$. The function $\Phi(x)$ is the cumulative distribution function (CDR) for the zero-mean, unit-variance, normal distribution, $\phi(x) = \exp(-x^2)/\sqrt{2\Pi}$:

$$\Phi(x) = \int_{-\infty}^{x} du \phi(u) \quad (5)$$

iii. Loss function Based on TPR at Low FPR

Referring back to FIG. 3, the process then estimates (at 320), for each instance used as an anchor, the true positive rate (TPR) of the network. During the training of the network, for a given anchor instance (e.g., instance $i_1$ of category $c_1$), each negative instance (e.g., instance $i_2$ of category $c_2$) is examined and the distance, $r_{c1i1;c2i2}$ between the anchor instance and the negative instance is computed. The TPR is then computed by using the distance $r_{c1i1;c2i2}$ as $r_{class}$.

Figure 4:
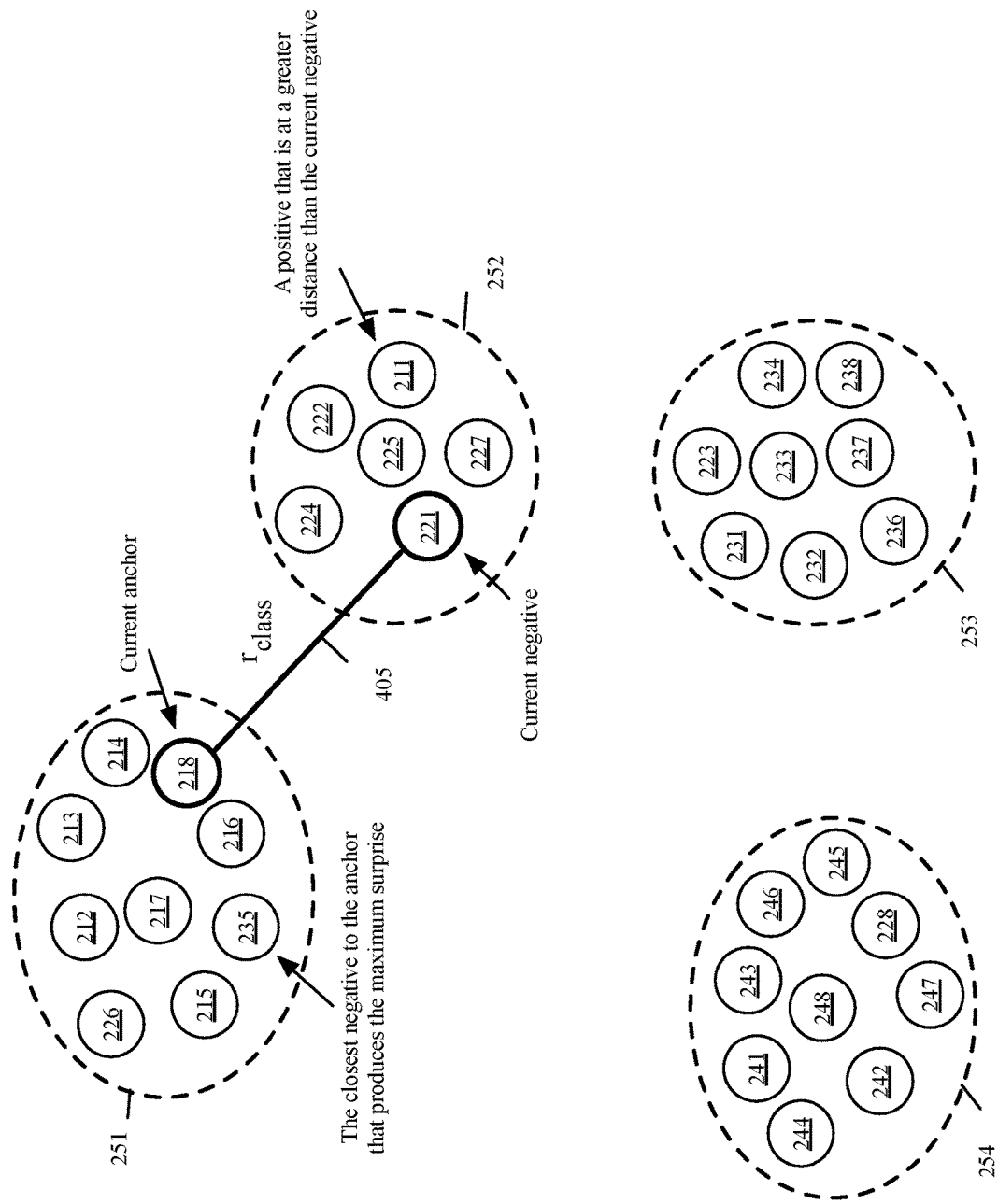
FIG. 4 conceptually illustrates the output points of the multi-layer node network of FIG. 2.

FIG. 4 conceptually illustrates the output points of the multi-layer node network of FIG. 2. As shown, an instance 218 in category $c_1$ 251 (i.e., an instance for which the expected ground-truth output is known to be category $c_1$) is selected as the current anchor. A negative instance (i.e., an instance for which the expected ground-truth output is not category $c_1$) is then selected as the current negative instance. In this example, instance 221 is the current negative instance. The distance 405 between the current anchor instance 218 and the current negative is computed and is used as $r_{class}$ for classifying the other instances.

For instance $i_1$ in category $c_1$ as the anchor, instance $i_2$ in category $c_2$ as the current negative instance, and the distance threshold $r_{c1i1;c2i2}$, the TPR is computed for category $c_1$ by using Equation (6):

$$R^{TP}_{c1i1;c2i2} = 1 - \Phi\left(\frac{\mu_{c1i1} - r^2_{c1i1;c2i2}}{\sigma_{c1i1}}\right) \quad (6)$$

Next, process 300, for each anchor and each negative instance computes (at 325) a surprise function for finding a positive instance that is at a greater distance from the anchor than the current negative instance $i_2$. In FIG. 4, instance 211 (which is expected to be a member of category $c_1$) is an example of a positive instance that is at a greater distance from the anchor instance 218 than the current negative instance 211. The surprise function for anchor instance $i_1$ in category $c_1$ and the current negative instance $i_2$ in category $c_2$ is computed by Equation (7):

$$S_{c1i1;c2i2} = \ln\frac{1}{R^{TP}_{c1i1;c2i2}} \quad (7)$$

Process 300, for each anchor instance, calculates (at 330) a loss function that maximizes the TPR at low false positive rate (FPR) by minimizing the worst surprise. The FPR corresponds to the TPR computed for the closest negative, i.e., the negative that produces the maximum surprise. For example, in FIG. 4, instance 235 is the closest negative instance to the anchor instance 218 and causes the maximum surprise. The loss term is, therefore, computed such that the worst surprise is minimized. For an anchor instance $i_1$ in category $c_1$, a loss term equal to the LogSumExp (LSE) maximum surprise over all negative instances as shown in Equation (8):

$$l_{c1i1} = \alpha_s \ln \sum_{c2 \neq c1} \sum_{0 \leq i2 < N_{c2}} \exp\left[\frac{S_{c1i1;c2i2}}{\alpha_s}\right] \quad (8)$$

where $\alpha_s$ is the LSE smoothing factor, measured in "nats." Nat is the natural unit of information or entropy that is based on natural logarithm and powers of the mathematical constant e. In order to prevent overflow or underflow, some embodiments first identify the maximum surprise $S_{max}$, over all negatives and then compute the LSE as in Equation (9):

$$l_{c1i1} = S_{max} + \alpha_s \ln \sum_{c2 \neq c1} \sum_{0 \leq i2 < N_{c2}} \exp\left[\frac{(S_{c1i1;c2i2} - S_{max})}{\alpha_s}\right] \quad (9)$$

Process 300 then calculates (at 335) the total loss for the set of input instances as the sum of the calculated losses for each anchor. The process then ends. The total loss, l, for a minibatch is computed by iterating over all instances in the minibatch, considering each instance in turn as the anchor and computing the loss term for that anchor. The total loss is then computed as the sum of all loss terms as shown in Equation (10):

$$l = \Sigma_{c1,i1} l_{c1i1} \quad (10)$$

Figure 5:
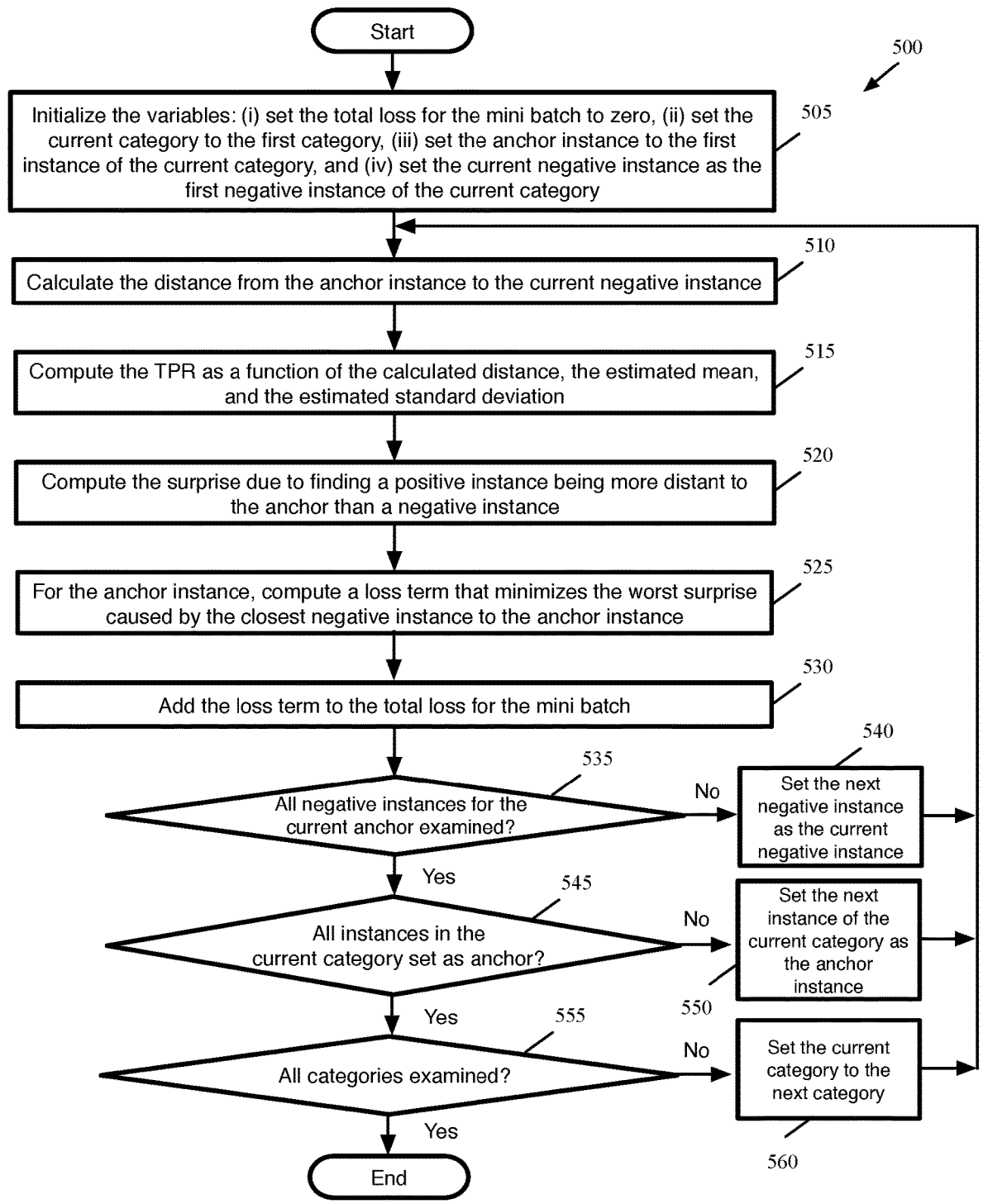
FIG. 5 conceptually illustrates a more detailed process for computing a loss function that maximizes true positive rate at low false positive rate in some embodiments.

FIG. 5 conceptually illustrates a more detailed process 500 for computing a loss function that maximizes TPR at low FPR in some embodiments. As shown, the process initializes (at 505) the variables for computing the loss function. The process sets the total loss for the minibatch to zero. The process also sets the current category to the first category. For instance, the process sets the current category to ci.

The process also sets the anchor instance to the first instance of the current category. For example, the process sets the anchor instance as instance 212 in FIG. 4. The process also sets the current negative instance as the first negative instance of the current category. For instance, in FIG. 4, the process sets the current negative instance to instance 221.

The process then calculates (at 510) the distance from the anchor instance to the current negative instance. For example, the process calculates the distance as shown by Equation (1), above. The process then computes (at 515) the TPR as a function of the calculated distance, the estimated mean, and the estimated standard deviation. For instance, the process computes the TPR as shown in Equation (6), above.

The process then computes (at 520) the surprise due to finding a positive instance being more distant to the anchor than a negative instance. For example, the process computes a surprise function as shown in Equation (7), above. The process, for the anchor instance, computes (at 525) a loss term that minimizes the worst surprise caused by the closest negative instance to the anchor instance. For example, the process computes the loss term as shown by Equation (9).

The process then adds (at 530) the loss term to the total loss for the minibatch. The process then determines (at 535) whether all negative instances for the current anchor are examined. If yes, the process proceeds to 545, which is described below. Otherwise, the process sets (at 540) the next negative instance as the current negative instance. For instance, in FIG. 4, the process sets the current negative instance to instance 222. The process then proceeds to 510, which was described above.

At 545, the process determines whether all instances in the current category are set as anchors. If yes, the process proceeds to 555, which is described below. Otherwise, the process sets (at 550) the next instance of the current category as the anchor instance. For instance, the process sets instance 213 in FIG. 4 as the anchor instance. The process then proceeds to 510, which was described above.

At 555, the process determines whether all categories are examined. If yes, the process ends. Otherwise, the process sets the current category to the next category. For instance, the process sets the current category to category $c_2$ in FIG. 4. The process then proceeds to 510, which was described above.

iv. Estimation of the Mean

The mean for instance i in category c is estimated as shown in Equation (11):

$$\mu_{ci1} = \frac{1}{N_c - 1} \Sigma_{0 \leq i2 < N_c; i2 \neq i1} r^2_{ci1;ci2} \quad (11)$$

where Nc is the number of instances of category c in the current minibatch.

v. Selection of the Standard Deviation

Some embodiments compute the standard deviation $\sigma^2_{ci}$ for an instance as a function of the mean $\mu_{ci}$. Some embodiments use a smoothed approximation of the mean as shown in Equation (12):

$$\sigma^2_{ci} = \beta^2 \max(\mu_{min}, \mu_{ci}) \quad (12)$$

where $\mu_{min}$ is a lower bound designed to prevent an anomalously small value for the mean (which could occur due to estimating the mean based on a small sample size) from yielding a small standard deviation that could cause the surprise to decrease too quickly with anchor to negative distance. $\mu_{min}$, is computed based on the distribution of means for the current minibatch, e.g., as the value of the mean occurring at the $10^{th}$ percentile (near the low end) of the distribution. Some embodiments smooth $\mu_{min}$, across several minibatches. $\beta$ is a user-specified hyperparameter (i.e., a parameter whose value is set before the training process begins).

By calculating the standard deviation as a function of the mean, it is ensured that the standard deviation scales with the mean as the space of mapped instance location, $y_{ci}$, evolves during training. This removes the motivation for the training process to expand or contract the space of the mapped instance locations in order to make the classification artificially appear more successful. For instance, suppose during training a point is reached where for each anchor the closest negative is farther than the average positive.

If a fixed standard deviation is used, it can be seen from Equation (6) that by inflating all coordinates of the output locations, such that the standard deviation is comparatively small, the loss function can be made zero even in a case where a negative is only slightly further from the anchor than the mean positive.

Similarly, if the instance locations for a given category are more spread out, it is expected that both the mean and standard deviation will be larger in the same proportion. For a fixed scale and category, it is expected that an anchor with a larger mean will also have larger standard deviation. To ensure that the loss function has continuous derivatives, the max function in Equation (12) is replaced with an LSE as shown in Equations (13) and (14):

$$\sigma_{ci}^2 = \beta^2 \mu_{min} LSE\left\{1, \frac{\mu_{ci}}{\mu_{min}}\right\} = \qquad (13)$$

$$\beta^2 \left[\max(\mu_{min}, \mu_{ci}) + \mu_{min}\alpha_\mu \ln\left(1 + e^{-\left|\frac{\mu_{ci}}{\mu_{min}} - 1\right|/\alpha_\mu}\right)\right] \qquad (14)$$

It should be understood that the dimensionless ratio $$\frac{\mu_{ci}}{\mu_{min}}$$

is smoothed so that the smoothing parameter $\alpha_\mu$ is also dimensionless. Therefore, the choice of smoothing parameter does not depend on the scale of coordinates of the output locations.

C. Loss Derivative

To train the neural network using stochastic gradient descent, the gradient of the loss function has to be computed. The following sections describe the chain-rule steps needed to compute the loss gradient.

i. Derivative of the Distance Function

The derivative for the function of distance is computed as shown in Equation (15):

$$\frac{\partial f^{(k)}(r_{c_1i_1;c_2i_2})}{\partial y_{c_1i_1;d}} = -\frac{\partial f^{(k)}(r_{c_1i_1;c_2i_2})}{\partial y_{c_2i_2;d}} = g_{c_1i_1;c_2i_2;d}^{(k)} \qquad (15)$$

When the function of distance is computed as Equation (2), the derivative is computed as shown in Equation (16):

$$g_{c_1i_1;c_2i_2;d} \equiv \frac{\partial r_{c_1i_1;c_2i_2}^2}{\partial y_{c_1i_1;d}} = 2[y_{c_1i_1;d} - y_{c_2i_2;d}] \qquad (16)$$

-continued $\|g_{c_1i_1;c_2i_2;d}\|$ increases linearly with distance ii. Derivative of Mean The derivative of the mean is computed as shown by Equation (17):

$$\frac{\partial \mu_{c_1i_1}}{\partial y_{c_2i_2;d}} = \frac{\delta_{c_1c_2}}{N_{c_1} - 1}\begin{cases} \sum_{i_3 \neq i_1} g_{c_1i_1;c_1i_3;d}^{(k)} & i_2 = i_1 \\ -g_{c_1i_1;c_1i_2;d}^{(k)} & i_2 \neq i_1 \end{cases} \qquad (17)$$

iii. Derivative of Standard Deviation

The derivative of the standard deviation is computed as shown by Equation (18):

$$\frac{\partial \sigma_{ci}^2}{\partial \mu_{ci}} = \beta^2\left\{1 - \exp\left[\frac{1}{\alpha_\mu}\left(1 - \frac{\sigma_{ci}^2}{\beta^2 \mu_{min}}\right)\right]\right\} \qquad (18)$$

Since $\sigma_{ci}^2 > \beta \mu_{min}$, the exponent in Equation (18) is negative. The derivative is therefore confined to the range $(0, \beta^2)$:

$$0 < \frac{\partial \sigma_{ci}^2}{\partial \mu_{ci}} < \beta^2 \qquad (19)$$

Therefore:

$$\frac{\delta \sigma_{ci}}{\delta \mu_{ci}} = \frac{1}{2\sigma_{ci}} \frac{\partial \sigma_{ci}^2}{\sigma \mu_{ci}} \qquad (20)$$

iv. Derivative of Surprise Function

The surprise derivative is computed as follows:

$$\frac{\partial S_{c_1i_1;c_2i_2}}{\partial y_{c_3i_3;d}} = -\frac{1}{R_{c_1i_2;c_2i_2}^{TP}}\frac{\partial R_{c_1i_1;c_2i_2}^{TP}}{\partial y_{c_3i_3;d}} \qquad (21)$$

$$= \frac{1}{\sigma_{c_1i_1}}\lambda\left(\frac{\mu_{c_1i_1} - f^{(k)}(r_{c_1i_1;c_2i_2})}{\sigma_{c_1i_1}}\right) \times \qquad (22)$$

$$\left[M_{c_1i_1;c_2i_2}\frac{\partial \mu_{c_1i_1}}{\partial y_{c_3i_3;d}} - (\delta_{c_1c_3}\delta_{i_1i_3} - \delta_{c_2c_3}\delta_{i_2i_3})g_{c_1i_1;c_2i_2;d}^{(k)}\right] \qquad (23)$$

$\lambda(x) \equiv \phi(x)/[1 - \Phi(x)]$ is the hazard function for the normal distribution, as described in the next section, and $M_{c_1i_1;c_2i_2}$, the coefficient of the mean derivative, is given by:

$$M_{c_1i_1;c_2i_2} \equiv \sigma_{c_1i_1}\frac{\delta}{\delta \mu_{c_1i_1}}\left(\frac{\mu_{c_1i_1} - f^{(k)}(r_{c_1i_1;c_2i_2})}{\sigma_{c_1i_1}}\right) \qquad (24)$$

$$= 1 - \frac{\mu_{c_1i_1} - f^{(k)}(r_{c_1i_1;c_2i_2})}{\sigma_{c_1i_1}}\frac{\partial \sigma_{c_1i_1}}{\partial \mu_{c_1i_1}} \qquad (25)$$

v. Hazard Function for the Normal Distribution

The hazard function X(x) is the probability density at X=x conditioned on X≥x:

$$\lambda(x) = P(X = x \mid X \geq x) = \frac{P(X = x)}{P(X \geq x)} = \frac{\phi(x)}{1 - \Phi(x)} \quad (26)$$

For the normal distribution, X(x) is equal to the expectation value of X conditioned on X≥x:

$$\left(E[X \mid X \geq x] = \frac{1}{1 - \Phi(x)} \int_x^\infty du\, u\phi(u) = \frac{\phi(x)}{1 - \Phi(x)} = \lambda(x)\right) \quad (27)$$

This shows that $\lambda(x)$ is a monotonically increasing function of x. the asymptotic behavior of $\lambda(x)$ for large negative and positive x is:

$$\lambda(x) \approx \phi(x) \text{ for large negative } x \quad (28)$$

$$\lambda(x) \approx x \text{ for large positive } x \quad (29)$$

In the context of the derivative of surprise, the hazard function represents the "hazard" of encountering a positive as the distance is decreased to the negative instance. This hazard rate increases monotonically as the negative moves closer to the anchor.

vi. Loss Derivative

The loss function derivative is computed as shown in Equation (30):

$$\frac{\partial l_{c_1 i_1}}{\partial S_{c_1 i_1; c_2 i_2}} = \frac{\exp[(S_{c_1 i_1; c_2 i_2} - S_{max})/\alpha_S]}{\sum_{c_3 \neq c_1} \sum_{0 \leq i_3 < N_{c_3}} \exp[(S_{c_1 i_1; c_3 i_3} - S_{max})/\alpha_S]} \quad (30)$$

This has the form of a Boltzmann probability. Negatives with the largest surprise will have the highest Boltzmann probability, and their surprise gradients will be given the highest weight in the loss gradient for a given anchor.

D. Training system

Figure 6:
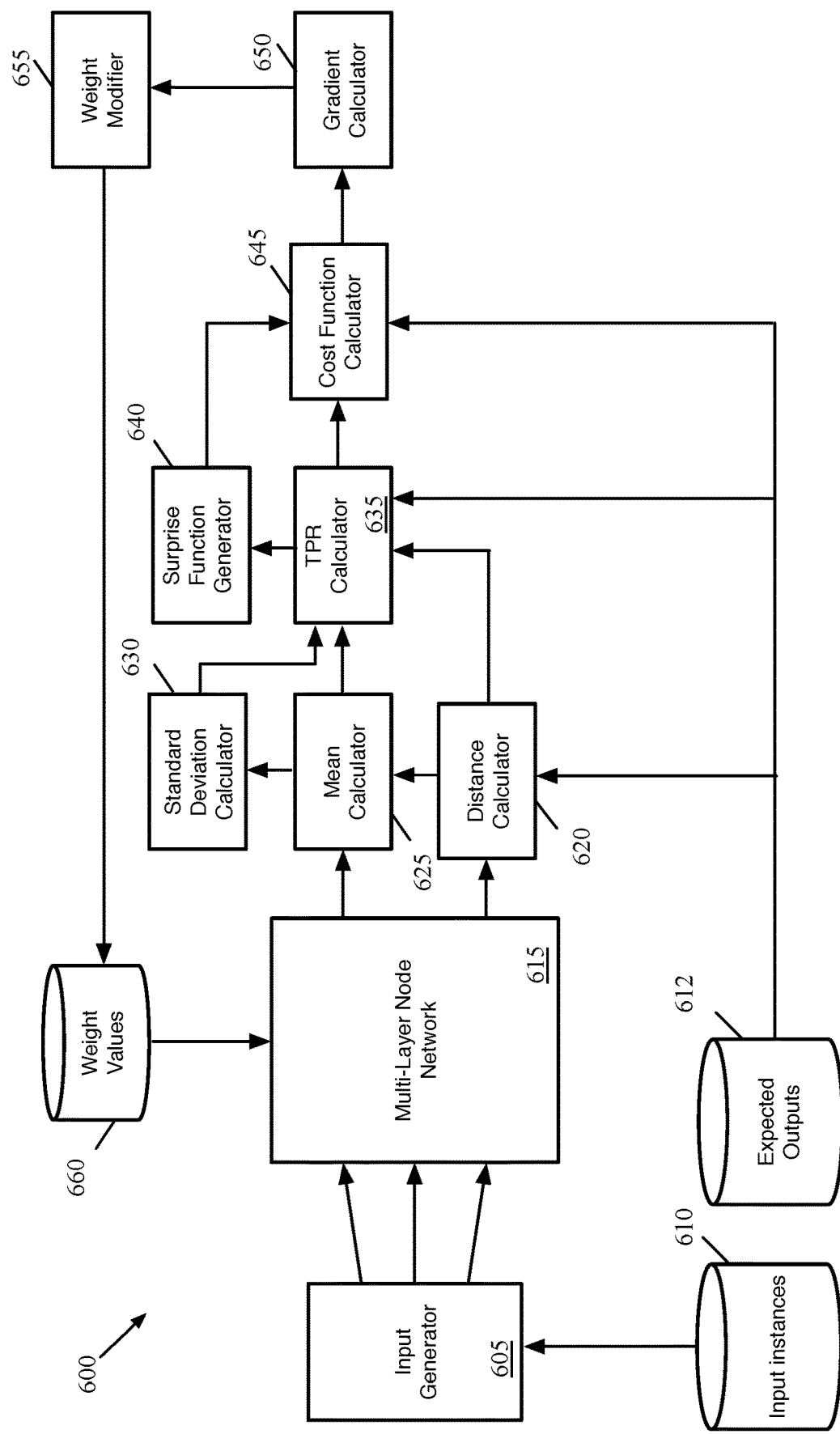
FIG. 6 conceptually illustrates a training system of some embodiments.

FIG. 6 conceptually illustrates a training system 600 of some embodiments. The training system propagates a minibatch of input instances through the multi-layer network, maps the input instances in the minibatch to a set of points in a multi-dimensional space. A loss function is then computed in order to maximize true positive rate of the network at low false positive rate.

As shown, the training system 600 includes an input generator 605, sets of input instances 610, expected outputs 612, a multi-layer node network 615, a distance calculator 620, a mean function estimator 625, a standard deviation calculator 630, a TPR calculator 635, a surprise function generator 640, a cost function calculator 645, a gradient calculator 650, a weight modifier 655, and a set of weight values 660.

The input instances 610 are propagated as a minibatch through the multi-layer network 615. For each minibatch, the expected output points (i.e., the expected categories of different instances) 612 is provided to different components of the system such the distance calculator 620, the TPR calculator 635, and the cost function calculator 645.

The mean calculator 625 calculates the mean value for an instance in a particular category. For example, the mean calculator 625 calculates the mean value as discussed above by reference to Equations (11). The standard deviation calculator 630 calculates the standard deviation for an instance in a particular category. For example, the standard deviation calculator 630 calculates the standard deviation as discussed above by reference to Equations (12).

The distance calculator 620 calculates the distance between an anchor distance and the current negative instance. The TPR calculator 635 calculates the TPR for each anchor instance. For example, the TPR calculator 635 calculates the TPR as discussed above by reference to Equation (6). The surprise function generator 640 computes the surprise function based on the TPR. For example, the surprise function generator 640 computes the surprise function as discussed above by reference to Equation (13).

The cost function calculator 645 calculates a cost function that maximizes TPR at low FPR. For example, the cost function calculator 645 calculates the cost function as discussed above by reference to Equations (8), (9), and (10). The gradient calculator 650 calculates the gradient of different functions. For example, the gradient calculator 650 calculates the gradient functions as discussed above by reference to Equations (15)-(30).

The gradient of the loss function is backpropagated into the multi-node network 615. The weight modifier 655 modifies the weights used by the multi-node network 615. The weight values are stored (as shown by 660) and the multilayer network 615 is updated with the modified values of the weights.

II. Electronic System

Figure 7:
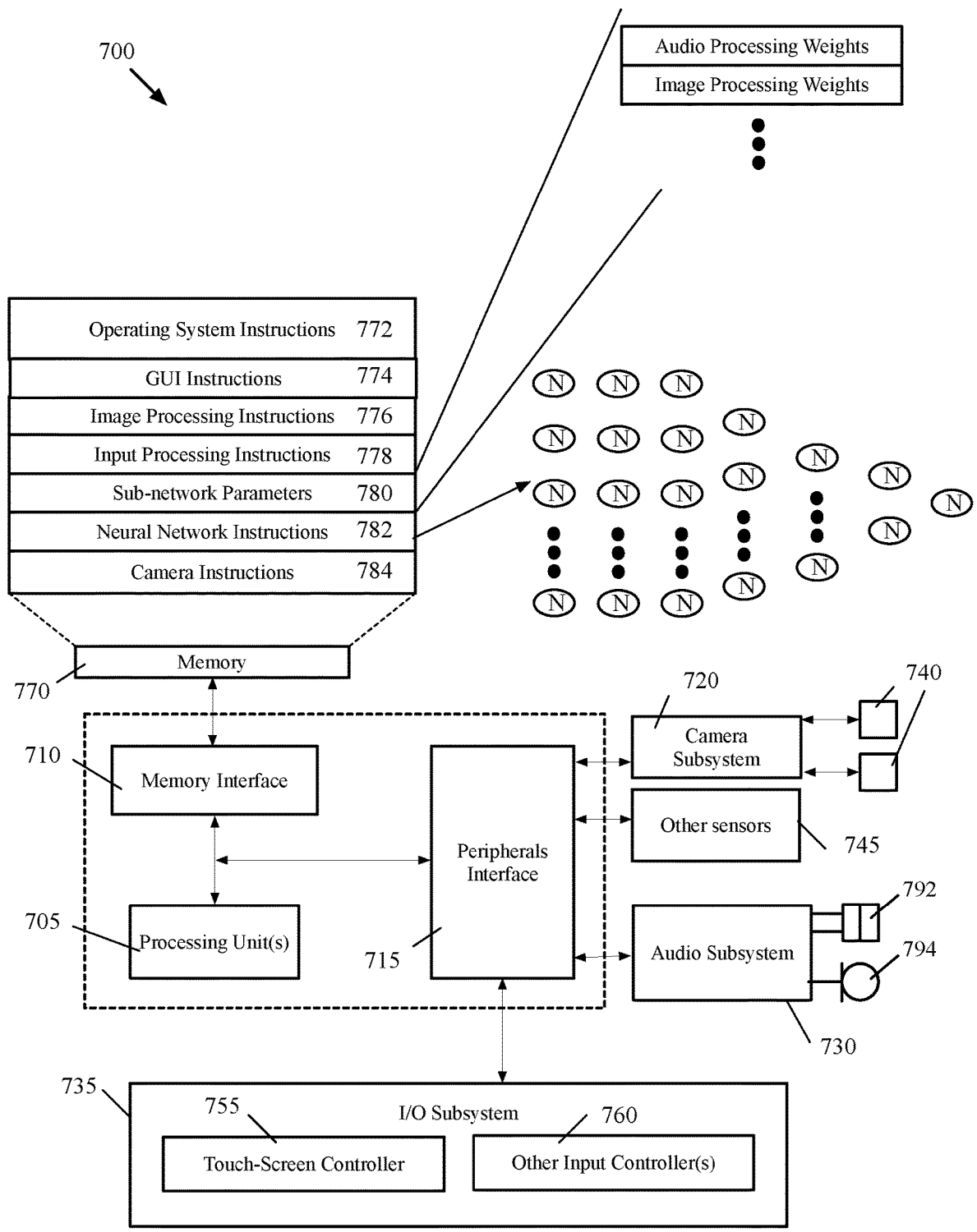
FIG. 7 illustrates an example of an architecture of a mobile computing device that stores neural network processing instructions, and multiple sub-networks that can be loaded into the processor for different purposes.

FIG. 7 is an example of an architecture 700 of a mobile computing device that stores neural network processing instructions, and multiple sub-networks that can be loaded into the processor for different purposes. Examples of mobile computing devices include smartphones, tablets, laptops, etc. As shown, the mobile computing device 700 includes one or more processing units 705, a memory interface 710 and a peripherals interface 715.

The peripherals interface 715 is coupled to various sensors and subsystems, including a camera subsystem 720, an audio subsystem 730, an I/O subsystem 735, and other sensors 745 (e.g., motion sensors), etc. The peripherals interface 715 enables communication between the processing units 705 and various peripherals. For example, an orientation sensor (e.g., a gyroscope) and an acceleration sensor (e.g., an accelerometer) can be coupled to the peripherals interface 715 to facilitate orientation and acceleration functions. The camera subsystem 720 is coupled to one or more optical sensors 740 (e.g., a charged coupled device (CCD) optical sensor), a complementary metal-oxide-semiconductor (CMOS) optical sensor, etc.). The camera subsystem 720 and the optical sensors 740 facilitate camera functions, such as image and/or video data capturing.

The audio subsystem 730 couples with a speaker 792 to output audio (e.g., to output voice navigation instructions). Additionally, the audio subsystem 730 is coupled to a microphone 794 to facilitate voice-enabled functions, such as voice recognition (e.g., for searching), digital recording, etc. The I/O subsystem 735 involves the transfer between input/output peripheral devices, such as a display, a touch screen, etc., and the data bus of the processing units 705 through the peripherals interface 715. The I/O subsystem 735 includes a touch-screen controller 755 and other input controllers 760 to facilitate the transfer between input/output peripheral devices and the data bus of the processing units 705. The touch-screen controller couples with a touch screen (not shown) to detect contact and movement on the touch screen using any of multiple touch sensitivity technologies.

The other input controllers 760 are coupled to other input/control devices, such as one or more buttons.

In some embodiments, the device includes a wireless communication subsystem (not shown in FIG. 7) to establish wireless communication functions. In some embodiments, the wireless communication subsystem includes radio frequency receivers and transmitters, and/or optical receivers and transmitters. These receivers and transmitters of some embodiments are implemented to operate over one or more communication networks such as a GSM® network, a Wi-Fi® network, a Bluetooth® network, etc.

The memory interface 710 is coupled to memory 770. In some embodiments, the memory 770 includes volatile memory (e.g., high-speed random access memory), non-volatile memory (e.g., flash memory), a combination of volatile and non-volatile memory, and/or any other type of memory. As illustrated in FIG. 7, the memory 770 stores an operating system (OS) 772. The OS 772 includes instructions for handling basic system services and for performing hardware dependent tasks.

The memory 770 also stores various sets of instructions, including (1) graphical user interface instructions 774 to facilitate graphic user interface processing; (2) image processing instructions 776 to facilitate image-related processing and functions; (3) input processing instructions 778 to facilitate input-related (e.g., touch input) processes and functions; and (4) camera instructions 784 to facilitate camera-related processes and functions. The processing units 705 execute the instructions stored in the memory 770 in some embodiments.

In addition, the memory 770 stores generic neural network instructions 782, for implementing a machine-trained network of some embodiments of the invention. The memory also stores multiple sets of sub-network parameters 780, including at least a set of weight values for an audio-processing network and a set of weight values for an image-processing network. These multiple sets of weights may be used by the processing units 705 when executing the neural network instructions 782 to perform a specific purpose (e.g., audio processing, image processing, etc.). If a larger number of the weight values for each network are 0, this simplifies the processing for each sub-network, as many of the edges (and possibly entire nodes) will effectively drop out.

The memory 770 further stores communication instructions to facilitate communicating with one or more additional devices. The instructions described above are merely exemplary and the memory 770 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

The memory 770 may represent multiple different storages available on the device 700. In some embodiments, the use of a discrete set of 1 and 2 bit weight values enables the storage of multiple sets of sub-network parameters in a limited-storage device, and in some cases in the memory closest to the processing units 705 in order to optimize the neural network processing.

While the components illustrated in FIG. 7 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 7 may be split into two or more integrated circuits.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
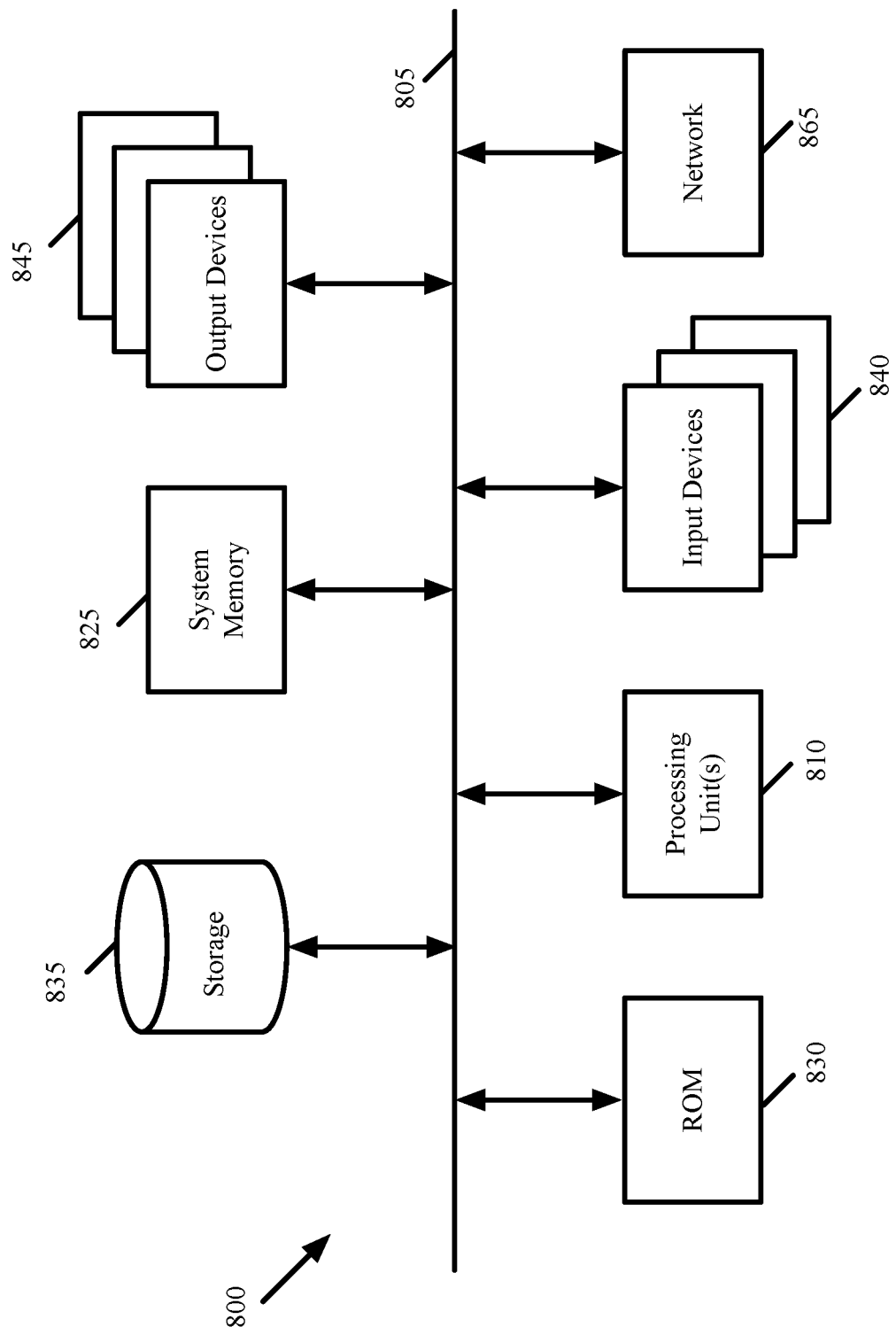
FIG. 8 conceptually illustrates an electronic system with which some embodiments of the invention are implemented.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1 and 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for training a machine-trained (MT) network that processes input data using a plurality of network parameters, the method comprising:
for each input instance of a set of input instances used for a training batch, propagating the input instance through the MT network to generate a corresponding output value for the input instance, wherein the set of input instances comprises, for each respective category of a set of three or more different categories, a respective plurality of input instances;
for each anchor instance of a plurality of the input instances selected as anchor instances, wherein the plurality of input instances selected as anchor instances comprises instances from each of the three or more different categories:
identifying a plurality of input instances that are in different categories than the anchor instance; and
computing a loss function term for the anchor instance based on (i) comparisons between the output value generated for the anchor instance and the output values generated for each of the identified input instances in different categories than the anchor instance and (ii) a calculated mean of distances between the output value generated for the anchor instance and the output values generated for each input instance in a same category as the anchor instance,
wherein, for each specific input instance, the output value generated for the specific input instance is used to compute (i) the loss function term for the specific input instance when the specific input instance is selected as the anchor instance and (ii) the loss function terms for each of a group of input instances in different categories than the specific input instance when the group of input instances are selected as anchor instances, without propagating the specific input instance through the MT network multiple times during the training batch;
computing a total loss function for the training batch for the MT network as a sum of the loss function terms computed for each selected anchor instance; and
training the network parameters using the computed total loss function.

2. The method of claim 1, wherein each output value is an output point in multiple dimensions, wherein the comparison between the output point generated for a particular anchor instance and the output point generated for a particular other input instance is a distance between said two output points computed by summing squares of distances between the two output points in each of the multiple dimensions.

3. The method of claim 2, wherein, for each anchor instance, the calculated mean of distances between the output value generated for the anchor instance and the output values generated for each input instance in the same category as the anchor instance is based on a distribution of distances between the output point generated for the anchor instance and the output points generated for each input instance in the same category as the anchor instance.

4. The method of claim 3, wherein the distances between the output point generated for the anchor instance and the output points generated for the input instances in the same category as the anchor instance are normally distributed.

5. The method of claim 1, wherein, for each anchor instance, computing the loss function term for the anchor instance further comprises calculating a standard deviation for the anchor instance as a function of the mean computed for the anchor instance.

6. The method of claim 5, wherein the standard deviation is further a function of a lower bound for the mean.

7. The method of claim 1, wherein the MT network is a neural network comprising input nodes, output nodes, and interior nodes between the input nodes and output nodes, wherein each node produces a node output value and each interior node and output node receives as input values a set of node output values of other nodes.

8. The method of claim 7, wherein each node of the MT network applies a set of the network parameters to each of its received input values to generate its node output value, wherein training the network parameters comprises:
backpropagating the computed total loss function for the training batch through the MT network to determine, for each network parameter of a set of the network parameters, a rate of change in the total loss function relative to a rate of change in the network parameter; and
modifying each network parameter in the set according to the determined rate of change for the network parameter.

9. The method of claim 1, wherein each input instance, of the set of input instances that comprises input instances from each of the three or more different categories, is selected as one of the anchor instances.

10. The method of claim 9, wherein, for each respective anchor instance, the respective identified plurality of input instances comprises all of the input instances in the set of input instances that are not in the same category as the respective anchor instance.

11. The method of claim 1, wherein:
the set of input instances comprises a set of input images;
the three or more different categories comprise different types of objects represented in the input images; and
for each input image, the corresponding output value generated by the MT network correlates to a particular category of object identified in the image by the MT network.

12. A non-transitory machine-readable medium storing a program which when executed by at least one processing unit trains a machine-trained (MT) network that processes input data using a plurality of network parameters, the program comprising sets of instructions for:
for each input instance of a set of input instances used for a training batch, propagating the input instance through the MT network to generate a corresponding output value for the input instance, wherein the set of input instances comprises, for each respective category of a set of three or more different categories, a respective plurality of input instances;
for each anchor instance of a plurality of the input instances selected as anchor instances, wherein the plurality of input instances selected as anchor instances comprises instances from each of the three or more different categories:
identifying a plurality of input instances that are in different categories than the anchor instance; and
computing a loss function term for the anchor instance based on (i) comparisons between the output value generated for the anchor instance and the output values generated for each of the identified input instances in different categories than the anchor instance and (ii) a calculated mean of distances between the output value generated for the anchor instance and the output values generated for each input instance in a same category as the anchor instance,
wherein, for each specific input instance, the output value generated for the specific input instance is used to compute (i) the loss function term for the specific input instance when the specific input instance is selected as the anchor instance and (ii) the loss function terms for each of a group of input instances in different categories than the specific input instance when the group of input instances are selected as anchor instances, without propagating the specific input instance through the MT network multiple times during the training batch;
computing a total loss function for the training batch for the MT network as a sum of the loss function terms computed for each selected anchor instance; and
training the network parameters using the computed total loss function.

13. The non-transitory machine-readable medium of claim 12, wherein each output value is an output point in multiple dimensions, wherein the comparison between the output point generated for a particular anchor instance and the output point generated for a particular other input instance is a distance between said two output points computed by summing squares of distances between the two output points in each of the multiple dimensions.

14. The non-transitory machine-readable medium of claim 13, wherein, for each anchor instance, the calculated mean of distances between the output value generated for the anchor instance and the output values generated for each input instance in the same category as the anchor instance is based on a distribution of distances between the output point generated for the anchor instance and the output points generated for each input instance in the same category as the anchor instance.

15. The non-transitory machine-readable medium of claim 11, wherein the set of instructions for computing, for each anchor instance, the loss function term for the anchor instance comprises a set of instructions for calculating a standard deviation for the anchor instance as a function of the mean computed for the anchor instance.

16. The non-transitory machine-readable medium of claim 15, wherein the standard deviation is further a function of a lower bound for the mean.

17. The non-transitory machine-readable medium of claim 12, wherein the MT network is a neural network comprising input nodes, output nodes, and interior nodes between the input nodes and output nodes, wherein each node produces a node output value and each interior node and output node receives as input values a set of node output values of other nodes.

18. The non-transitory machine-readable medium of claim 17, wherein each node of the MT network applies a set of the network parameters to each of its received input values to generate its node output value, wherein the set of instructions for training the network parameters comprises sets of instructions for:
- backpropagating the computed total loss function for the training batch through the MT network to determine, for each network parameter of a set of the network parameters, a rate of change in the total loss function relative to a rate of change in the network parameter; and
- modifying each network parameter in the set according to the determined rate of change for the network parameter.

\* \* \* \* \*